United States Patent [19]

White et al.

[11] 4,038,088

[45] July 26, 1977

[54] MOLD RELEASE AGENT

[75] Inventors: John R. White, Wadsworth; Ram M. Krishnan, Monroe Falls; James D. Wolfe, North Canton, all of Ohio

[73] Assignee: The Goodyear Tire & Rubber Company, Akron, Ohio

[21] Appl. No.: 557,193

[22] Filed: Mar. 10, 1975

[51] Int. Cl.$^2$ .............................................. B28B 7/36
[52] U.S. Cl. ................................. 106/38.24; 106/243; 164/33; 264/48; 264/54; 264/338; 427/135
[58] Field of Search .................. 106/38.24, 38.7, 243, 106/285, 8; 427/135; 164/33; 264/338, 130, 213, 264, 48, 54, 300; 260/2.5 AZ

[56] References Cited

U.S. PATENT DOCUMENTS

| | | | |
|---|---|---|---|
| 1,462,563 | 7/1923 | Voltz | 106/38.24 |
| 2,901,361 | 8/1959 | Meisel | 106/38.24 |
| 2,976,160 | 3/1961 | Fronczak | 106/38.24 |
| 3,413,390 | 11/1968 | Heiss | 264/338 |
| 3,468,991 | 9/1969 | Krug | 427/133 |
| 3,694,530 | 9/1972 | Wolfe | 428/218 |

*Primary Examiner*—Lorenzo B. Hayes
*Attorney, Agent, or Firm*—F. W. Brunner; J. D. Wolfe

[57] ABSTRACT

A mold release agent comprising metallic soaps of the fatty acids in combination with 0.03 to one percent of a polyurethane catalyst selected from secondary and tertiary amines and organic tin compounds.

5 Claims, No Drawings

MOLD RELEASE AGENT

This invention relates to an improved polyurethane mold release agent and to the molded polyurethane article produced using said mold release agent.

One of the most persistent problems experienced in making polyurethane molded articles is the supplying of a consistent mold release agent. For example, under certain conditions waxes and polyethylene offer excellent mold release ability but under other operating conditions such as change of weather, compounding, molding temperature, shape of the molded article, polyethylene and waxes may be entirely unsatisfactory. The same is true with the silicone mold release agents and even is experienced with the more elite sodium and potassium soaps of the aliphatic acids. For instance, water and alcohol solutions or dispersions of the sodium and potassium soaps of the fatty acids have been utilized in molding the bumper and other exterior parts made with polyurethane for automobiles for a number of years. Usually these parts are nonporous or microcellular in nature rather than being considered as of the integral skin type such as that dealt with in U.S. Pat. No. 3,694,530.

In making the molded polyurethane exterior articles for automobiles, there are times when excellent molded products are made for hours or days at a time. Then for some unexplained reasons the molded products have poor skins, thin skins, stick to the mold and the mold release begins to accumulate in the mold to affect the over-all aesthetic appearance of the molded product. Generically, these defects are sometimes referred to as skin delamination.

When these things happen the molding technologists usually recommend increasing the amount of mold release being used, reformulating the polyurethane molding compositions, change the mold temperature, or all of these, or either suffers the difficulty until it unexplainably goes away and attempts to repair the molded products having these defects. Consequently, production is reduced and per item costs go up.

We have discovered the above difficulties can be reduced or eliminated by incorporating a small amount of a polyurethane catalyst in the mold release agent prior to the time it is applied to the mold. Usually about one-tenth to one-half of the precent of the catalyst per hundred parts on a solid basis of the sodium or potassium soap is sufficient to eliminate the problems occasioned by mold release build-up, thin porous skins, or what we have diagnosed as being improper cures of the polyurethane in the surface area due to cold spots in the mold. In some instances, as little as 0.03 percent to as much as one percent can be used.

The polyurethane catalysts broadly are of two classes, the secondary and tertiary amines and the tin compounds.

The -tetramethylethylenediamine, and tertiary amines or polyamines useful as catalysts in this invention are alkyl, alkaryl, arylalkyl and aryl radical substituted secondary and tertiary amines and polyamines where the radical contains from 1 to 20 carbon atoms. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N,-dimethylethanolamine, N,N-diethylethanolamine, dialkyl (amine alkyl either) viz. dimethyl (aminoethyl) ether, tetramethyl-1,3-butanediamine, 1,5-secondary diamino naphthalene, 2,4-secondary diamino toluylene; N,N'-secondary ethylene diamine, N,N'-secondary 1,3-propylene diamine, N,N'-secondary 1,4-butylene diamine and N,N'-secondary 1,3-butylene diamine.

Representative members of the tin compounds are alkyltin carboxylates and mercaptides such as dibutyltin dilaurate, diamyltin dilaurate or oleates of these or the mercaptides of the dialkyltin mercaptides where alkyl radical has from 1 to 20 carbon atoms.

The mold release agent of this invention can be made by mixing the polyurethane catalyst in an aqueous or alcoholic dispersion of sodium or potaassium soap of an aliphatic acid to give a catalyst level of 0.1 to 1 percent by weight on a soap basis. Hereinafter the aqueous or alcoholic dispersion above may be referred to as a diluent solution of a sodium or potassium soap of a carboxylic acid having the structure

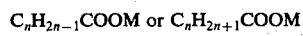

$$C_nH_{2n-1}COOM \text{ or } C_nH_{2n+1}COOM$$

where $n$ is 11 or greater, with the upper limit being about 22 carbon atoms and M is sodium or potassium. This soap release is used preferably to coat the mold as an aqueous solution or alcoholic solution, or their mixture containing mixed therein the polyurethane catalyst. Then the polyurethane reaction mixture is brought into contact with the shaper to obtain a shaped polyurethane article. The shaped polyurethane article is removed from the shaper and then may be washed with water of at least 60° C. but less than the boiling point, i.e. approximately 95° C. of water to remove any adhered mold release agent. The cleaned, shaped polyurethane is dried, preferably for about 10 to 30 minutes at 120° to 160° C. and then at least one coat of a suitable primer coating material followed by a topcoat such as a nondiscoloring polyurethane may be applied over the shaped polyurethane to give it protection against discoloration when exposed for the equivalent of 3000 hours in an infrared Fadeometer.

The soap release agent is prepared by making a mixture of 1 to 5 percent by weight of the soaps of sodium or potassium carboxylate where the carboxylate contains from 12 to 25 carbon atoms in admixture with a diluent of 100 to 95 percent by weight of an alcohol selected from methanol, ethanol and propanol or an alcohol and water mixture, where the water is 0 to 30 percent of the diluent. Satisfactory handling characteristics are obtained with the aqueous mixture where the soap level is 1 to 5 percent and the alcohol level is 99 to 95 percent. When the alcohol level in the alcohol-water diluent is less than about 25 percent the mixture is nonflammable. Representative soaps of the above formula useful in this invention are the sodium and potassium soaps of the fats and vegetable oils such as sodium and potassium oleate or stearate and their impure mixture obtained by saponfication of fatty acids having 12 to 25 carbon atoms.

The specific and representative nature of this invention is illustrated further by the following representative embodiments, where all parts and percentages are by weight unless otherwise indicated.

EXAMPLE I

A microcellular polyurethane was cast in an automobile bumper mold. The mold was spray coated with release agents shown in Table 1 to give a release barrier on the aluminum mold and allowed to dry before the microcellular polyurethane reaction mixture was added. The nature of microcellular polyurethane reaction mixture and the mold release is described in greater detail hereinafter.

The microcellular polyurethane reaction mixture reacted and foamed to give a cured foam on standing a half hour at 110° C. The microcellular polyurethane bumper was stripped from the mold and flushed with water at 75° C. for 1 minute to clean away the soap on the surface.

The microcellular bumper was dried at 65° to 95° C. for 15 to 20 minutes and then was spray painted with a primer coat and a nondiscoloring polyurethane solution, i.e. a mixture of a methyl ethyl ketone solution of the prepolymer of polytetramethylene adipate and 4,4'-dicyclohexyl methane diisocyanate and isophorone diamine, 2,2', 4,4'-tetrahydroxybenzophenone and titanium dioxide to give a coating 3 to 10 mils thick. The coated bumper was allowed to dry overnight and then sections were cut from the bumper for peel tests. A tape peel test (a paint peel test) was run on these sections according to the procedure described on page 4 in the U.S. Ser. No. 248,361, filed Apr. 28, 1972.

The use of activators in the amount shown in Table 1 with the control sodium soap release permitted more parts to be molded from the same mold equipment with less rejects than achievable with control release.

While certain representative embodiments and details have been shown for the purpose of illustrating the invention, it will be apparent to those skilled in this art that various changes and modifications may be made therein without departing from the spirit or scope of the invention.

What is claimed is:

1. A mold release containing a solution of a sodium or potassium soap of a fatty acid having the structure $C_nH_{2n-1}COOH$ or $C_nH_{2n+1}COOH$ where $n$ is an integer having values of 11 to 22 and 99 to 95 percent by weight of a diluent consisting of alcohol or alcohol and water with the amount of water varying from 0 to 24 percent by weight and the alcohol being selected from the group consisting of methanol and ethanol, isopropanol, and a polyurethane cayatlyst selected from the class consisting of secondary amines, tertiary amines and organo tin compounds.

2. The mold release of claim 1 wherein the catalyst is triethylene diamine.

3. The mold release of claim 1 wherein the catalyst is present in 0.03 to one percent by weight.

4. The mold release of claim 1 wherein the catalyst is dibutyltin dilaurate.

5. The mold release of claim 3 wherein the catalyst is dibutyltin dilaurate.

Table 1

| Mold Release Control** + Activator | Mold Temp. ° F. | Release Characteristics | Surface Appearance | Remarks |
|---|---|---|---|---|
| 1. Control + 0 | 120–135 | Excellent | Fair-Excellent | Some skin delamination where excess release was sprayed, rejected or repaired.* |
| 2. Control + 0.1% dibutyltin dilaurate | 110–118 | Excellent | Excellent | Surface very good even where excess release was present. |
| 3. Control + 0.1% triethylene diamine | 120–135 | Exellent | Excellent | Same as 2. |
| 4. Control + 0.2% dibutyltin dilaurate | 115–125 | Excellent | Excellent | Excellent surface. |
| 5. Control + 0.2% triethylene diamine | 120 | Excellent | Excellent | Excellent surface. |
| 6. Control + 0 | Half mold — 130 Half mold — 100* | Excellent | Fair-Excellent | Skin delamination where cold spots are present. |
| 7. Control + 0.2% dibutyltin dilaurate | Half mold — 125 Half mold — 100* | Excellent | Good-Excellent | Very slight skin delamination where cold spots are present. |
| 8. Control + 0.2% triethylene diamine | " | Excellent | Good-Excellent | No visible skin delamination where cold spots are present. |

*Cold spots caused by placing dry ice on sections of mold.
**The control release agent was a 90/10% blend of methanol-ethanol containing 1% of the sodium soap of fat (fatty acid).

UNITED STATES PATENT AND TRADEMARK OFFICE
CERTIFICATE OF CORRECTION

PATENT NO. : 4,038,088

DATED : July 26, 1977

INVENTOR(S) : John R. White, Ram M. Krishnan and James D. Wolfe

It is certified that error appears in the above—identified patent and that said Letters Patent are hereby corrected as shown below:

In column 1, line 47, correct "the precent" to read -- a percent --;

In column 1, line 58, change "-tetramethylethylenediamine" to -- secondary --.

Signed and Sealed this

Twenty-sixth Day of September 1978

[SEAL]

Attest:

RUTH C. MASON
Attesting Officer

DONALD W. BANNER
Commissioner of Patents and Trademarks